Feb. 18, 1941.   E. E. MOYER   2,232,553
ELECTRIC VALVE CIRCUIT
Original Filed Sept. 30, 1938
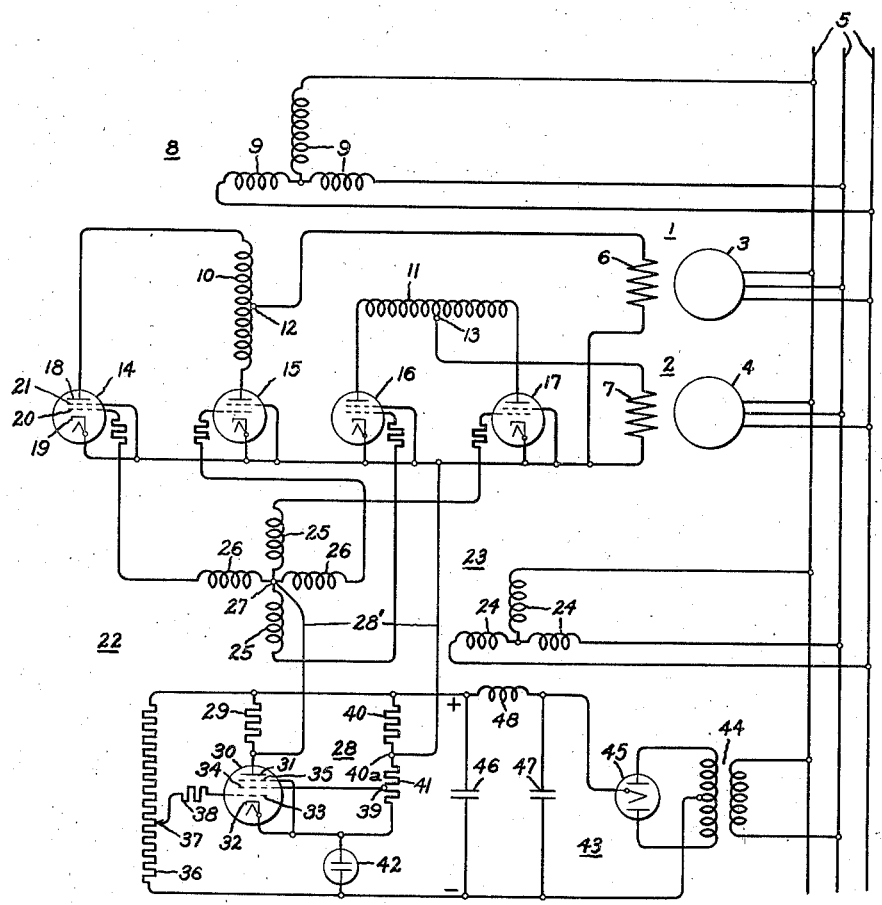
Inventor:
Elmo E. Moyer,
by Harry E. Dunham
His Attorney.

Patented Feb. 18, 1941

2,232,553

UNITED STATES PATENT OFFICE 2,232,553

ELECTRIC VALVE CIRCUIT

Elmo E. Moyer, Scotia, N. Y., assignor to General Electric Company, a corporation of New York Original application September 30, 1938, Serial No. 232,599. Divided and this application May 2, 1939, Serial No. 271,297

10 Claims. (Cl. 250—27)

My invention relates to electric valve circuits and more particularly to electric valve regulating or control circuits.

This application is a division of my copending application Serial No. 232,599 entitled "Electric regulating system," filed September 30, 1938 and assigned to the assignee of the present application.

In electric valve systems, it is frequently desirable to provide a control circuit which produces a control voltage, such as a unidirectional voltage, which varies precisely and accurately in response to variations in a predetermined controlling influence such as variations in the magnitude of a unidirectional voltage or in response to the magnitude of an alternating voltage. Heretofore, the arrangements provided for accomplishing this result have entailed the use of considerable amount of equipment, and hence the use of these arrangements has in some instances been prohibitive from the standpoint of initial cost and maintenance. In accordance with the teachings of my invention described hereinafter, I provide a new and improved electric valve circuit for producing a control voltage which varies precisely and accurately in response to a predetermined controlling influence.

It is an object of my invention to provide a new and improved electric valve circuit.

It is another object of my invention to provide a new and improved electric valve circuit which produces a unidirectional control voltage in response to variations in magnitude of a unidirectional voltage or in response to the variations in magnitude of an alternating voltage.

Briefly described, in the illustrated embodiment of my invention I provide an improved regulating circuit for controlling the voltage of an output circuit in accordance with the voltage of an alternating current circuit. A rectifying circuit produces a variable unidirectional voltage which varies in accordance with the voltage of the alternating current circuit, and a serially-connected resistance and an electric valve means vary the voltage supplied to the output circuit. The conductivity of the electric valve means is controlled by a bridge circuit in accordance with the magnitude of the unidirectional voltage. A glow discharge valve serves as a voltage standard and is connected in series relation with the resistance and the electric valve means.

For a better understanding of my invention, reference may be had to the following description taken in connection with the accompanying drawing and its scope will be pointed out in the appended claims. The single figure of the accompanying drawing diagrammatically illustrates an embodiment of my invention as applied to an electric valve translating and regulating system for energizing the field windings of a pair of parallel connected alternating current generators or synchronous condensers.

Referring now to the single figure of the accompanying drawing, I have chosen to show my invention as applied to an electric valve translating system associated with a plurality of machines, such as a pair of alternating current dynamo electric machines 1 and 2 which may be alternating current generators or synchronous condensers. The machines 1 and 2 are preferably designed to be electrically similar, that is, the machines 1 and 2 are designed to have substantially identical electrical constants and characteristics. Machines 1 and 2 are provided with armature windings 3 and 4, respectively, which are connected to an associated polyphase circuit such as a three-phase alternating current circuit 5. Machines 1 and 2 are also provided with independent field or excitation windings 6 and 7, respectively, having only one common terminal of the same polarity.

I provide an electric translating system including a suitable phase transforming means, such as a Scott-connected or a T-connected transformer 8, which is connected to the alternating current circuit 5 and which effects an even distribution of load on circuit 5. Transformer 8 comprises primary windings 9 and independent secondary windings 10 and 11 having isolated neutral or intermediate connections 12 and 13, respectively. Unidirectional current is transmitted to field winding 6 from excitation winding 10 through suitable rectifying means such as a pair of electric valve means 14 and 15, and unidirectional current is transmitted to the field winding 7 from secondary winding 11 through electric valves 16 and 17. The electric valves 14 and 17 are preferably of the type employing an ionizable medium, such as a gas or a vapor, and each may comprise an anode 18, a cathode 19, and a control member or grid 20. If desired, the electric valves 14 to 17 may also be provided with a shield grid 21 which may be connected to the associated cathode 19.

I provide a single control or regulating circuit 22 which controls the resultant voltage impressed on the control grids 20 of electric valves 14 to 17 in accordance with a predetermined electrical condition such as the armature voltage of machines 1 and 2, or in accordance with an electrical condition such as the voltage of the alternating current circuit 5. I provide a phase transforming means such as a transformer 23 which is arranged in a Scott-connection or a T-connection for impressing on the control grids 20 of electric valves 14 to 17 alternating voltages being displaced in phase in a lagging direction relative to the anode-cathode voltages by substantially 90 electrical degrees. Transformer 23 includes primary windings 24 and a pair of secondary windings 25 and 26. Secondary windings 25 and 26 are connected to afford an electrical neutral connection 27.

As an agency for superimposing on the alternating grid voltages a unidirectional voltage which varies in accordance with an electrical condition of machines 1 and 2, such as the armature voltage of these machines, I provide a circuit 28. Circuit 28 may be of the bridge type having a pair of branches, one of which includes a suitable impedance element, such as a resistance 29, through which there is transmitted variable amounts of unidirectional current to control the resultant voltage appearing across its terminals and hence, to control the resultant voltage impressed on the control grids 20 of electric valves 14 to 17. An electric valve 30, which is preferably of the high vacuum type, transmits variable amounts of unidirectional current through resistance 29 and hence, controls the voltage appearing across the terminals of resistance 29. The electric valve 30 may include an anode 31, a cathode 32, a control grid 33, a screen grid 34, and a suppressor grid 35. The control grid 33 is connected to a point of suitable potential such as that provided by a voltage divider 36 having an adjustable contact or tap 37. A suitable current limiting resistance 38 may be connected in series relation with the control grid 33, if desired. The screen grid 34 is connected to a point of suitable potential, such as point 39 of a voltage divider comprising a pair of serially connected resistances 40 and 41 which constitute the other branch of the bridge. Resistances 40 and 41 are also connected in series relation with a suitable constant voltage device, such as an electric valve 42 of the glow discharge type. The resultant unidirectional voltage impressed on the control grids 20 is obtained from the lower terminal of resistance 29 and the common juncture 40a of resistances 40 and 41 through an output circuit 28' which is connected to neutral 27 and the cathodes 19 of electric valves 14–17. The conductivity of the electronic discharge device 30 is controlled by the above described elements which may be considered as a voltage responsive bridge circuit, the resistance 36 constituting one branch of the bridge circuit, and the resistances 40 and 41 and the glow discharge valve 42 constituting the other branch of the bridge circuit.

Circuit 23 also includes a circuit 43 which produces a unidirectional voltage of the polarity indicated and the magnitude of which varies in accordance with the armature voltage of machines 1 and 2 or the voltage of circuit 5. Circuit 43 may be a bi-phase rectifier and may comprise a transformer 44 which is connected to circuit 5, a suitable rectifying device such as an electric valve 45, and a filter circuit comprising capacitances 46 and 47 and an inductance 48.

The operation of the embodiment of my invention may be explained by considering the system when the machines 1 and 2 are operating in parallel as synchronous alternating current generators transmitting energy to the alternating current supply circuit 5. Variable amounts of unidirectional current are transmitted to the field windings 6 and 7 of machines 1 and 2 through electric valves 14, 15, and 16, 17 from secondary windings 10 and 11 respectively. The resultant voltages impressed on the control grids 20 of electric valves 14 to 17 vary in phase with respect to the associated anode-cathode voltages to control the average current conducted by the electric valve means and hence, control the average current transmitted to the field windings 6 and 7.

Due to the fact that the transformer 23 is connected to produce a quadrature system of voltages, one of the components of voltage impressed on the control grids 20 lags the respective anode-cathode voltages by substantially 90 electrical degrees. A variable unidirectional component of voltage is supplied by resistance 29 of circuit 28. The conductivity of the electric valve 30 is varied in response to the voltage of circuit 5. The potential of the control grid 33 and the potential of the screen grid 34 both vary in response to the magnitude of the unidirectional voltage furnished by transformer 44, rectifier 45, and the filter circuit including capacitances 46 and 47 and inductance 48. By virtue of the fact that the potentials of both the control grid and the screen grid vary in accordance with the condition to be regulated, the amplification of the electric valve 30 will be large and hence, the sensitivity of the regulating system will be relatively great. If the voltage of the alternating current circuit 5 tends to rise above the predetermined value with respect to the standard voltage established by electric valve 42, the resultant unidirectional voltage drop appearing across the resistance 29 will decrease, effecting a retardation in phase of the resultant voltage impressed on the control grids 20 of the electric valves 14 to 17 thereby causing the electric valves to conduct a smaller amount of current and consequently, effecting a reduction in the voltage generated by machines 1 and 2. Conversely, if the voltage of circuit 5 decreases below the value to be maintained, the resultant unidirectional voltage drop appearing across the resistance 29 will increase, effecting an increase in the field current transmitted to windings 6 and 7.

Referring more particularly to the operation of the circuit 23, the glow discharge valve 42 serves to maintain a predetermined constant voltage so that the cathode 32 of the electric valve 30 is maintained at a substantially constant potential relative to the negative terminal of the output circuit of rectifier 43. In addition, the glow discharge valve 42 serves to effect an increased amplification by the electric valve 30 by placing the entire increment or decrement of the voltage of the output circuit of rectifier 43 on the control grid 34. As the output voltage of circuit 43 changes, the entire change in voltage is impressed on the grid 34 and this change in potential acting conjointly with the change in potential impressed on the control grid 33 effects a substantial change in the current transmitted through resistance 29 to effect more precise control of the electric valves 14–17.

Inasmuch as the field windings 6 and 7 of the means 1 and 2 are energized through a Scott-connected transformer the load imposed on the alternating current circuit 5 is evenly distributed. Of course, it will be understood that if these field windings were energized separately from single phase transformers connected to the circuit 5, the load imposed on the circuit 5 will be concentrated on two phases of that circuit, whereas in the embodiment illustrated the load is evenly distributed. It is to be understood that while I have shown my invention as applied to an electric valve translating system for energizing two direct current circuits from a three-phase alternating current circuit, my invention may be applied to a system in which a plurality of direct current circuits are energized from an associated alternating current circuit having a number of phases greater than the number of direct current circuits.

An important feature of the embodiment of my invention described above is the facility with which a plurality of valves of intermediate current rating may be used to supply the field current for a number of machines. An additional important feature is the arrangement which permits the utilization of a single voltage controlling or regulating circuit for controlling the resultant voltages impressed on the control members of a plurality of electric valves which energize field windings of electrical machines operating in parallel.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of variable unidirectional voltage, an output circuit, means comprising in series relation across said source an impedance element, an electric valve means and a glow discharge valve, said electric valve means having a control grid and a second control grid, means connected across said source for impressing on said control grid a voltage which varies as the voltage of said source, and voltage dividing means connected across said impedance element and said electric valve means for impressing on said second control grid a voltage which varies as the voltage of said source, said output circuit being connected between said voltage-dividing means and a point in the circuit including said impedance element and said electric valve means which varies in potential in response to the current transmitted by said electric valve means.

2. In combination, a source of variable unidirectional voltage, an output circuit, means connected in series relation across said source and comprising an impedance element, an electric valve means and a constant voltage device, said electric valve means having a control grid, a circuit connected between one terminal of said source and the common conjuncture of said electric valve means and said constant voltage device, and means connected across said source for impressing on said control grid a voltage which varies as the voltage of said source, said output circuit being connected between a point of said last-mentioned circuit and the common conjuncture of said impedance element and said electric valve means.

3. In combination, a source of variable unidirectional voltage, an output circuit, means connected across said source comprising in series relation a voltage divider and a constant voltage device, a serially connected impedance element and an electric valve means connected between one terminal of said source and the common juncture of said voltage divider and said constant voltage device, said electric valve means having a control grid, and means connected across said source for impressing on said control grid a unidirectional voltage which varies as the voltage of said source, said output circuit being connected between a point of said voltage divider and the circuit including said impedance element and said electric valve means.

4. In combination, a source of variable unidirectional voltage, a bridge circuit comprising a pair of branches one of which includes a voltage divider and the other of which includes a serially connected impedance element and an electric valve means, a glow discharge valve connected between one terminal of said source and said pair of branches, an output circuit connected between said pair of branches, said electric valve means being provided with a control grid for controlling the conductivity thereof, and means connected across said source for impressing on said control grid a voltage which varies with the voltage of said source.

5. In combination, an alternating current circuit, a load circuit, electric translating apparatus connected between said circuits comprising an electric valve means having a control member for controlling the conductivity thereof, and an excitation circuit for impressing on said control member a variable unidirectional potential comprising a source of unidirectional voltage which varies in accordance with a predetermined controlling influence, a serially-connected impedance element and an electric valve means connected to be energized from said source of unidirectional potential, said second mentioned valve means having a control grid and a second control grid, a voltage divider connected to be energized from said source for impressing on said control grid a predetermined component of voltage of said source and a second voltage divider connected to be energized from said source for impressing on said second control grid a predetermined component of voltage of said source.

6. In combination, an alternating current circuit, an output circuit, and means for varying the voltage of said output circuit in accordance with the voltage of said alternating current circuit and comprising rectifying means for producing a source of variable unidirectional voltage which varies as the voltage of said alternating current circuit, a serially-connected impedance element and an electric valve means connected to be energized from said source, said electric valve means being provided with a control grid and a second control grid, a voltage divider for impressing on said control grid a voltage which varies as the voltage of said source and a second voltage divider for impressing on said second control grid a voltage which varies as the voltage of said source.

7. In combination, an alternating current circuit, a source of unidirectional voltage the magnitude of which varies in accordance with an electrical condition of said circuit, an output circuit, means comprising in series relation across said source an impedance element, an electric valve means and a glow discharge valve, said electric valve means having a control grid and a second control grid, means connected across said source for impressing on said control grid a voltage which varies as the voltage of said source and means connected across said impedance element and said electric valve means for impressing on said second control grid a voltage which varies as the voltage of said source, said output circuit being connected between said last mentioned means and the juncture of said impedance element and said electric valve means.

8. In combination, a source of variable unidirectional voltage, means connected in series relation across said source and comprising an impedance element, an electric valve means and a constant voltage device, said electric valve means having an anode, a cathode and a control grid, a circuit connected between one terminal of said source and the common juncture of said electric valve means and said constant voltage device, means for impressing on said control grid a voltage which varies as the voltage of said source, and an output circuit connected between points of the first-mentioned means and said circuit such that the potential difference therebetween varies in response to the amount of current transmitted by said electric valve means.

9. In combination, a source of variable unidirectional voltage, means connected in series relation across said source and comprising an impedance element, an electric valve means and a constant voltage device, said electric valve means having an anode, a cathode and a control grid, a circuit connected between one terminal of said source and the common juncture of said electric valve means and said constant voltage device, means for impressing on said control grid a voltage which varies as the voltage of said source, and an output circuit having one terminal thereof connected to the common juncture of said impedance element and said electric valve means and having the other terminal thereof connected to said first mentioned circuit.

10. In combination, a source of variable unidirectional voltage, an impedance element, an electronic discharge device connected in series relation with said impedance element for transmitting variable amounts of current from said source through said element and comprising a pair of control grids, a voltage responsive bridge circuit connected across said source and comprising a pair of branches one of which includes a voltage divider for impressing a voltage on one of said control grids and the other of which includes a serially-connected resistance and a glow discharge valve for impressing a control voltage on the other of said grids, and a circuit having one terminal connected to the common juncture of said impedance element and said electronic discharge device and having the other terminal connected to said resistance.

ELMO E. MOYER.